United States Patent
Hu et al.

(10) Patent No.: US 8,963,812 B2
(45) Date of Patent: Feb. 24, 2015

(54) DETACHABLE HYBRID DISPLAY COMPRISING ORGANIC PHOTOCONDUCTOR-BASED ELECTRONIC COVER

(71) Applicant: Xerox Corporation, Norwalk, CT (US)

(72) Inventors: Nan-Xing Hu, Oakville (CA); Johann E. Junginger, Toronto (CA); Gregory McGuire, Oakville (CA); Vladislav Skorokhod, Vaughan (CA)

(73) Assignee: Xerox Corporation, Norwalk, CT (US)

( * ) Notice: Subject to any disclaimer, the term of this patent is extended or adjusted under 35 U.S.C. 154(b) by 93 days.

(21) Appl. No.: 13/798,728

(22) Filed: Mar. 13, 2013

(65) Prior Publication Data
US 2014/0268276 A1   Sep. 18, 2014

(51) Int. Cl.
*G09G 3/20* (2006.01)
*G02F 1/01* (2006.01)
*G02F 1/19* (2006.01)

(52) U.S. Cl.
CPC ... *G02F 1/01* (2013.01); *G02F 1/19* (2013.01)
USPC ................. 345/75.2; 345/84; 345/173; 345/5

(58) Field of Classification Search
None
See application file for complete search history.

(56) References Cited

U.S. PATENT DOCUMENTS

| | | | |
|---|---|---|---|
| 4,126,854 A | 11/1978 | Sheridon | |
| 4,143,103 A | 3/1979 | Sheridon | |
| 5,508,720 A | 4/1996 | DiSanto et al. | |
| 7,166,396 B2 | 1/2007 | Qi et al. | |
| 7,284,708 B2 | 10/2007 | Martin | |
| 7,342,571 B2 | 3/2008 | Fraser et al. | |
| 7,414,776 B2 | 8/2008 | Liu et al. | |
| 7,903,083 B2 | 3/2011 | Goudarzi | |
| 8,064,962 B2 | 11/2011 | Wilcox et al. | |
| 8,119,314 B1 | 2/2012 | Heuft et al. | |
| 8,119,315 B1 | 2/2012 | Heuft et al. | |
| 8,120,719 B2 | 2/2012 | Seki et al. | |
| 2010/0141689 A1* | 6/2010 | Johnson | 345/690 |
| 2010/0245221 A1* | 9/2010 | Khan | 345/87 |
| 2011/0080417 A1 | 4/2011 | Lin et al. | |
| 2013/0314622 A1* | 11/2013 | Braganza et al. | 349/12 |

* cited by examiner

*Primary Examiner* — Muhammad N Edun
(74) *Attorney, Agent, or Firm* — Fox Rothschild LLP (57) ABSTRACT

A method and apparatus for displaying a reflective image in response to light emitted from an emissive display is disclosed. An apparatus includes an emissive display, a processor in communication with the emissive display, and an electronic cover proximate to the emissive display. The electronic cover includes a passive display layer having a plurality of passive display elements and a photosensitive layer responsive to emitted light from the emissive display. A method includes forming an emitted light image on the emissive display and exposing the photoconductor layer of the electronic cover to an emitted light image, causing the plurality of passive display elements to form a reflective image on the passive display layer so that the reflective image corresponds to the displayed image.

17 Claims, 6 Drawing Sheets

DETACHABLE HYBRID DISPLAY COMPRISING ORGANIC PHOTOCONDUCTOR-BASED ELECTRONIC COVER

BACKGROUND

Portable devices such as smart phones, navigation units, tablet personal computers, and the like are generally equipped with an emissive color display, i.e., a color liquid crystal display (LCD), light emitting diode (LED) display, and organic LED (OLED) display. Emissive displays offer excellent indoor viewing experience but are difficult to view when used outdoors, especially under direct sunlight. Devices with emissive display also consume more energy, requiring more frequent battery charging.

In contrast, passive displays, also referred to as reflective displays such as electronic paper displays, offer improved readability for both indoor and outdoor applications. Passive displays rely on reflected light for viewing and consume much less energy due to their inherent bistability. This type of display is widely adapted in various e-book readers available in the marketplace. Examples include displays using electronic ink or rotating bi-colored beads. To take the advantages of both emissive and passive displays, integrated hybrid LCD/electronic paper displays have been proposed. Although the integrated hybrid display offers some advantages over conventional emissive displays, it also suffers from several shortcomings. For example, prior attempts to create a hybrid display also require complicated and costly electronic design for controlling both displays. Further, the viewability of the emissive display in the integrated hybrid design described above is decreased.

SUMMARY

Various scenarios disclosed in this document describe an apparatus and method for displaying a reflective image in response to light emitted from an emissive display. The method includes receiving, by a photoconductor layer of an electronic cover, emissive light from an emissive display of an electronic device and generating, by a passive display layer of the electronic cover, a refractive image in response to the emissive light received by the photoconductor layer.

According to scenarios disclosed in this document, an electronic device includes an emissive display, a processor in communication with the emissive display, and an electronic cover proximate to the emissive display. The electronic cover includes a passive display layer having a plurality of passive display elements and a photosensitive layer responsive to emitted light from the emissive display. The electronic device further includes a computer readable storage medium configured to store program instructions which, when executed, cause the processor to form an emitted light image on the emissive display and expose the photoconductor layer of the electronic cover to an emitted light image, causing the plurality of passive display elements to form a reflective image on the passive display layer so that the reflective image corresponds to the displayed image.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

As used in this document, a statement that a device or system is "in electronic communication with" another device or system means that devices or systems are configured to send data, commands and/or queries to each other via a communications network. The network may be a wired or wireless network such as a local area network, a wide area network, an intranet, the Internet or another network.

An "electronic device" refers to a device that includes an imaging device, a processor and tangible, computer-readable memory. Examples of suitable devices include portable electronic devices such as smart phones, personal digital assistants, cameras, tablet devices, electronic readers, personal computers, media players, satellite navigation devices and the like.

A "emissive display" is any display apparatus that is viewed by observing light emitted from the display itself. Examples include transmissive liquid crystal displays (LCDs), light emitting diode (LED) displays, organic light emitting diode (OLED) displays, and any other display apparatus that relies on emitted light to function.

A "passive display" is any display apparatus that relies on reflected light for viewing. Commonly referred to as electronic paper displays, examples include Gyricon™ displays, electronic ink displays, electrophoretic displays, electrowetting displays, electrofluidic displays, cholesteric liquid crystal displays, interferometric modulator displays, and any other reflective and/or bistable display that is viewed by observing light reflected from the display.

An "electronic cover" refers to an overlay adapted to substantially cover an emissive display on an electronic device. An electronic cover may include a single or multi-layered structure and may contain passive display elements.

This document describes a detachable hybrid display design including a photo-addressable electronic paper, or passive, display that is placed on top of an electronic device that includes an emissive display and/or touch screen. The photo-addressable passive display includes a reflective display comprising a passive display layer and a photoconductor layer. When a user of the electronic device desires a reflective display for more comfortable reading or outdoor use, the photo-addressable passive display is attached to the electronic device and placed over the device's emissive display. The passive display cover may have an electrical connector that can plugged into or otherwise paired with the electronic device to obtain power from the electronic device. Alternatively, the passive display may use or be connected to a battery element or other external power source. In either scenario, the reflective display element forms the viewing image. The organic photoconductor element in contact with the emissive display is used as an opto-electronic driver to convert the emissive image to a reflective image. Since the photo-addressable passive display can be made as a thin sheet, use of the electronic device's touch screen interface is not inhibited. The proposed hybrid display also does not require a complicated micro-electronic control system design.

Specifically, the proposed approach for converting an emissive image to a reflective image includes: providing a electronic device having an emissive display with or without a touch screen feature; providing a photo-addressable electronic cover comprising a photo-sensitive layer, a reflective display, and an electrical connector; attaching the photo-addressable electronic cover to the electronic device with the photo-sensitive element proximate to the emissive display; and connecting the electrical connector with the electronic device to obtain power. The photo-sensitive element serves as a driver to convert the emissive image output by the electronic device's emissive display to a reflective image on the electronic paper. The approach provides improved viewing experience for outdoor use and reading.

Figure 1:
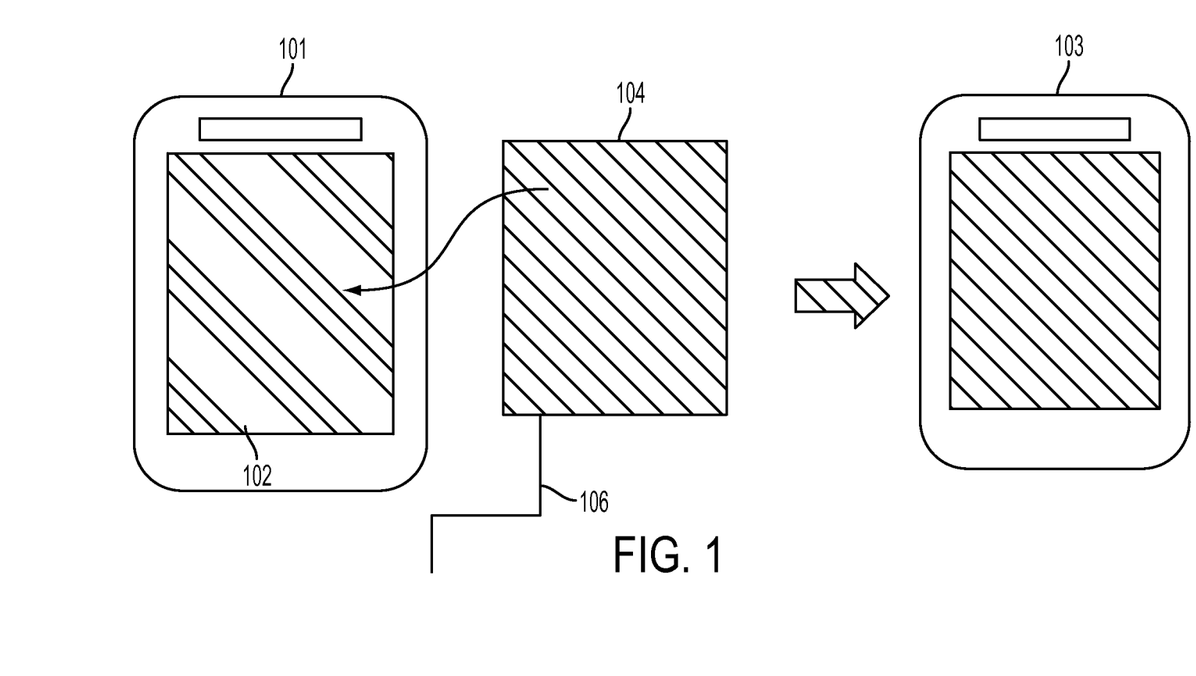
FIG. 1 is a diagram showing an electronic device and an electronic cover.

Referring now to FIG. 1, a diagram is provided that illustrates an example scenario of how the proposed hybrid display is used. An electronic device 101 includes an emissive display 102. The electronic device 101 may be a smart phone or tablet computer, for example. The emissive display 102 can utilize any emissive light display technology, including any variation of transmissive liquid crystal display (LCD), light emitting diode (LED), organic LED (OLED), and the like. Additionally, emissive display 102 may be equipped with any touch interface, including any variation of resistive and capacitive touch screen interfaces and the like.

Also shown in FIG. 1 is a passive display 104. The passive display 104 may be in the form of an electronic cover that is shaped and sized to fit over most or all of emissive display 102 of electronic device 101. The passive display includes elements, described in more detail below in reference to FIG. 2, that convert the images emitted from the emissive display into images that can be viewed using reflective light, e.g. resembling printed text. The passive display elements of passive display 104 may be any passive display technology.

The passive display 104 includes a power cable 106 that is used to provide power to the passive display elements. Optionally, the power cable can have any interface that can connect to the electronic device. Although not required, the passive display also may include connectors for control signals, such as licensed proprietary connectors or standardized connecters such as universal serial bus (USB) and any variants thereof.

The passive display 104 may be in the form of an electronic cover that fits over the emissive display 102 of the electronic device 101 to form a hybrid device 103. The emissive display 102 on the hybrid device 103 continues to function as it would without the presence of the passive display 104 (i.e., as it would in electronic device 101). However, through processes described below, the passive display 104 converts the emissive light images from the emissive display 102 to reflective images viewed with reflected light.

Figure 2:
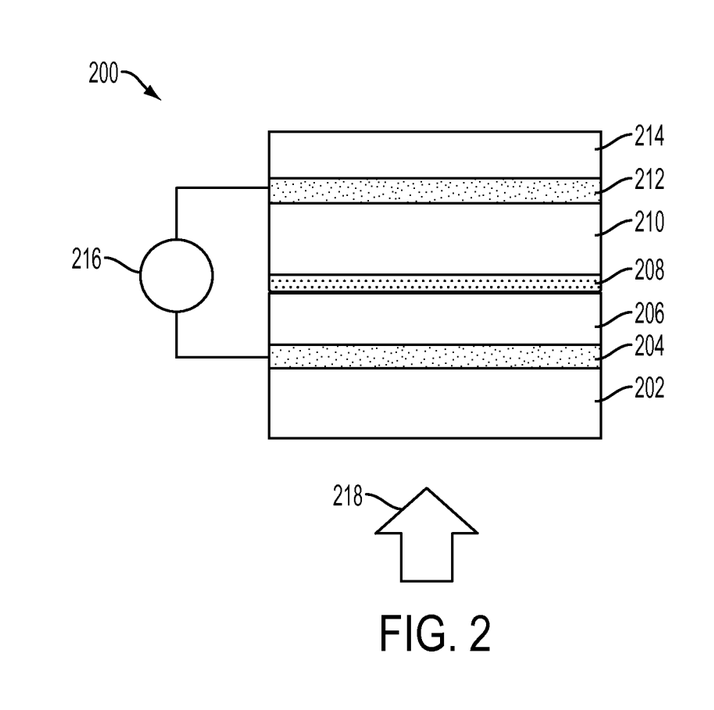
FIG. 2 is a diagram showing an example structure for an electronic cover.

Referring now to FIG. 2, a scenario is shown illustrating an example internal structure for an electronic cover 200 that includes a passive display. Electronic cover 200 includes a number of active and/or passive layers that function together to convert an emissive light image 218 to a reflective image generated by the passive display. In the scenario shown in FIG. 2, electronic cover 200 includes a transparent substrate layer 202 which can be any suitable transparent substrate material including a transparent polymer film and glass. Electronic cover 200 also includes a pair of transparent electrodes 204, 212. The transparent electrodes 204, 212 are configured to generate an electric field through the intermediate layers 206, 208, 210. Materials suitable for use as transparent electrodes 204, 212 include transparent conductive metal oxides such as indium tin oxide (ITO), tin oxide, and zinc oxide (ZnO), conductive polymers, thin film metal, metal nanowires, and carbon-based conductive materials such as carbon nanotubes and grapheme, and the like. The polarity and strength of the electric field generated by transparent electrodes is dynamic and can be altered through automatic and manual means. Transparent electrodes 204, 212 are powered by power source 216. As described above in reference to FIG. 1, the power source 216 may be the battery of an electronic device to which the electronic cover 200 is connected. Alternatively, the electronic cover 200 may be powered by a separate battery or other power source coupled with the electronic cover itself. The scenarios are not limited in this regard.

Figure 3:
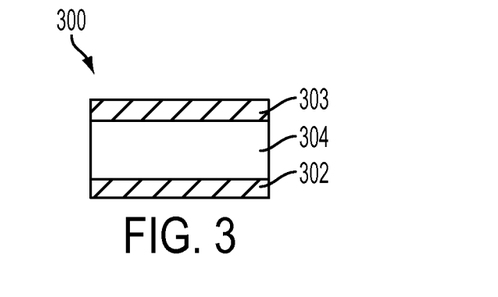
FIG. 3 is a diagram showing an example structure for a photosensitive layer.
Figure 4:
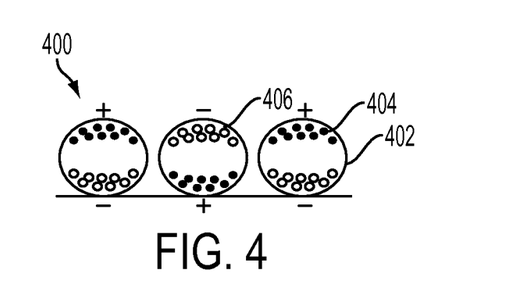
FIG. 4 is a diagram showing an example structure for a passive display pixel array.

Between the transparent electrodes 204, 212 are a number of intermediate layers. In the scenario shown in FIG. 2, the intermediate layers include a photosensitive layer 206, a light absorption layer 208, and a passive display layer 210. The light absorption layer 208 is provided to block any ambient light from the surface. This layer may comprise a dye or pigment, and optionally a resin that can dissolve the dye or disperses the pigment. Photosensitive layer 206 may be a photoconductive material that, when exposed to light, changes impedance properties in accordance with the irradiation intensity of the exposing light. In other words, the photosensitive layer 206 has sensitivity to light in the wavelength region of the exposing light and absorbs light in the wavelength region to provide the corresponding electric properties in accordance with the irradiation intensity of the exposing light. The photosensitive layer 206 may comprise a single-layered or multi-layered structure. The photosensitive layer 206 may comprise any suitable photoconductive materials that are sensitive to emissive light from a portable device, including inorganic photoconductors, photoconductive polymers, organic photoconductors, or inorganic and organic hybrid materials. In an embodiment, photosensitive layer 206 may comprises a layered structure comprised of a charge generation layer and a charge transport layer. A scenario of a photosensitive layer 300 is illustrated in FIG. 3A, comprising a bottom generation layer 302, a charge transport layer 304, and an upper charge generation layer 303. The charge generation layers generate charges as a result of the absorption of electromagnetic radiation, e.g., radiation within the visible light spectrum. The charge generation layer may comprises any photosensitive pigments known in the prior art, such as azo-pigments, perylene pigments, phthalocyanine pigments, and any combination thereof. For example, photosensitive materials suitable for the charge generation layer are those that have broad absorption in visible spectra, including pigments such as perylene bisimide disclosed in U.S. Pat. Nos. 6,162,571 and 6,165,661, and 6,464,902, the disclosures of which are incorporated by reference in their entireties. An example perylene bismide suitable for this use has a chemical structure shown below:

R is hydrogen, alkyl, cycloalkyl, substituted alkyl, aryl, substituted aryl, aralkyl, or substituted aralkyl.

The charge generation layers 302 and 303 may further include a binder resin for hosting the photosensitive pigments, including, for example, polycarbonate resin, polyvinyl butyral resin, polyallylate resin, polyester resin, vinyl chloride-vinyl acetate resin, acrylic resin, polyamide resin, polyvinylpyridine resin, cellulose resin, urethane resin, epoxy resin, or the like. The thickness of the charge generation layers may be in the range of from about 0.01 to about 1 micrometer.

Charge transport layer 304 can be any material suitable for transporting charges that are generated in the charge generation layer in the direction of an applied electric field. Charge transport is important for the operation of the passive display layer, as described below in reference to FIG. 4. Materials suitable for the charge transport layer include tertiary aylamines such as molecules with following structures:

X is hydrogen, alkyl, cycloalkyl, substituted alkyl, aryl, substituted aryl, aralkyl, or substituted aralkyl; and R1 to R4 each independently represents a hydrogen atom, an alkyl, a substituted alkyl, or the like.

The charge transport layer 304 may further comprises a polymer binder to host the charge transport materials. Polymer binder for use in the charge transport layer may include the same one that is used for the charge transport layer as described above. Further suitable polymer binder include polycarbonate resin, polystyrene, polysiloxane, or the like. The thickness of the charge transport layer may be in the range of from about 0.5 to about 50 micrometers, or from about 1.0 to about 25 micrometers.

Passive display layer 210 can be any passive display technology. In one scenario, illustrated in FIG. 4, the passive display layer 400 may include a number of passive display pixels 402. Each passive display pixel 402 may include one more bistable electronic ink elements that include a black negatively charged pigment 404 and a white positively charged pigment 406. As shown in FIG. 3B, negatively charged black pigment 404 is attracted to a positive charge and repulsed by a negative charge. Conversely, positively charged white pigment 406 is attracted to a negative charge and repulsed by a positive charge. As a result, the position of the pigments within the passive display pixel 402 is determined by the polarity and strength of the electric field across the passive display layer 400. Because the passive display pixels 402 are bistable in this scenario, once the pigments 402, 404 are positioned they do not move until an adverse electric field is applied. As long as the electric field does not change polarity and have a strength over an activation threshold of the passive display pixels 402 (i.e. the threshold at which the pigments will be attracted/repulsed by the electric field), the pigments 402, 404 will remain in place, even if the electric field is shut of entirely. One skilled in the art will recognize that an array of passive display pixels 402 can be manipulated to form reflective images by altering the electric field across the array. Thus, depending on the charge generated by the photosensitive layer in response to the light emitted by the emissive display, the photosensitive layer may cause the passive layer to display a reflective image that corresponds to the image that is output by the emissive display. As used in this document, the reflective image corresponds to the emitted image, although there may be differences between the images due to limitations of the reflective display or other factors. For example, the reflective image may comprise different colors than the emitted image, or the reflective image may be limited to two colors, or the images may have different degrees of sharpness, brightness or similar characteristics.

Figure 5A:
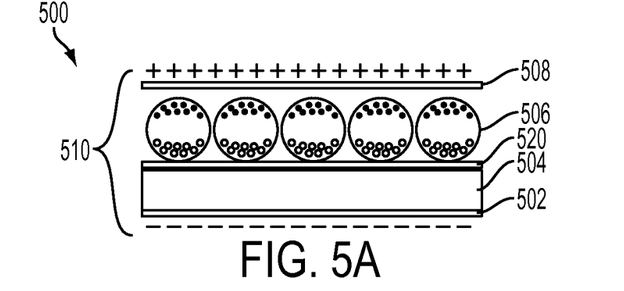
FIGS. 5A-5D are a series of diagrams showing a scenario for converting an emissive light image to a reflective light image using an electronic cover.

A scenario for forming reflective images in a passive display using emitted light from an emissive display is shown in FIGS. 5A-5D. In FIGS. 5A-5D, the transparent substrate and the protective layer are not shown for simplicity. Referring now to FIG. 5A, a passive display system 500 is shown that includes a bottom transparent electrode 502, a photosensitive layer 504, a light absorption layer 520, a passive display layer 506, and an upper transparent electrode 508. Across the passive display system 500 is an electric field 510 that is applied through the electrodes. In the scenario shown in FIG. 5A, the electric field is set to a strength and polarity that causes the white pigment of the passive display layer to be displayed. This operates to refresh and/or clear the screen to present a "blank page."

Figure 5B:
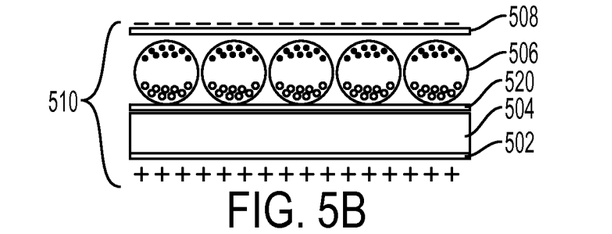
Figure 5C:
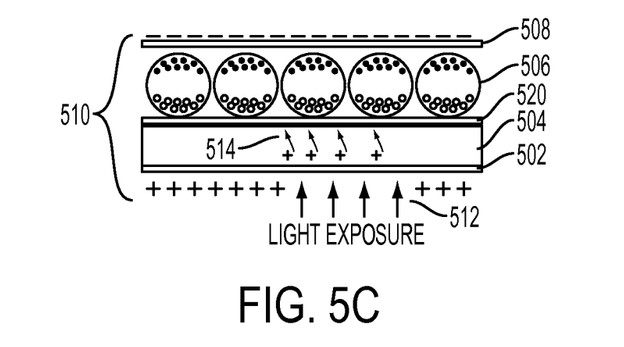

After the screen is cleared, the polarity of the electric field 510 is reversed, as shown in FIG. 5B. However, the strength of the electric field 510 is kept below the activation threshold of the passive display layer 506, so that the pigments do not shift. Referring now to FIG. 5C, light is emitted from an emissive display (not shown) exposing the photosensitive layer 504 to emitted light 512. In the exposed region, the photoconductive materials contained in photosensitive layer 504 change impedance properties in accordance with the irradiation intensity of the exposing light, hereby providing the corresponding charge distribution to create an increased electrical field cross the passive display layer 506. As shown in FIG. 5C, negatively charged black pigment particles are located at the bottom of each passive display pixel in the passive display layer 506. The emitted light 512, as well as any stray ambient light (not shown) is absorbed by light absorption layer 520.

Figure 5D:
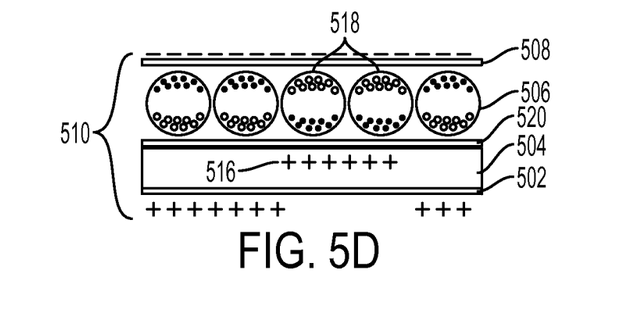

Referring now to FIG. 5D, as a result of the charge distribution change in the exposed region, the electric field is locally altered around passive display pixels 518 by an amount sufficient to exceed the activation threshold for passive display pixels 518. The negatively charged black pigment is repulsed by the positive charge now proximate to the underside of the passive display layer 504. The black pigment is forced to the topside of the passive display layer 504 and forms a reflective image visible using reflective light.

Figure 6:
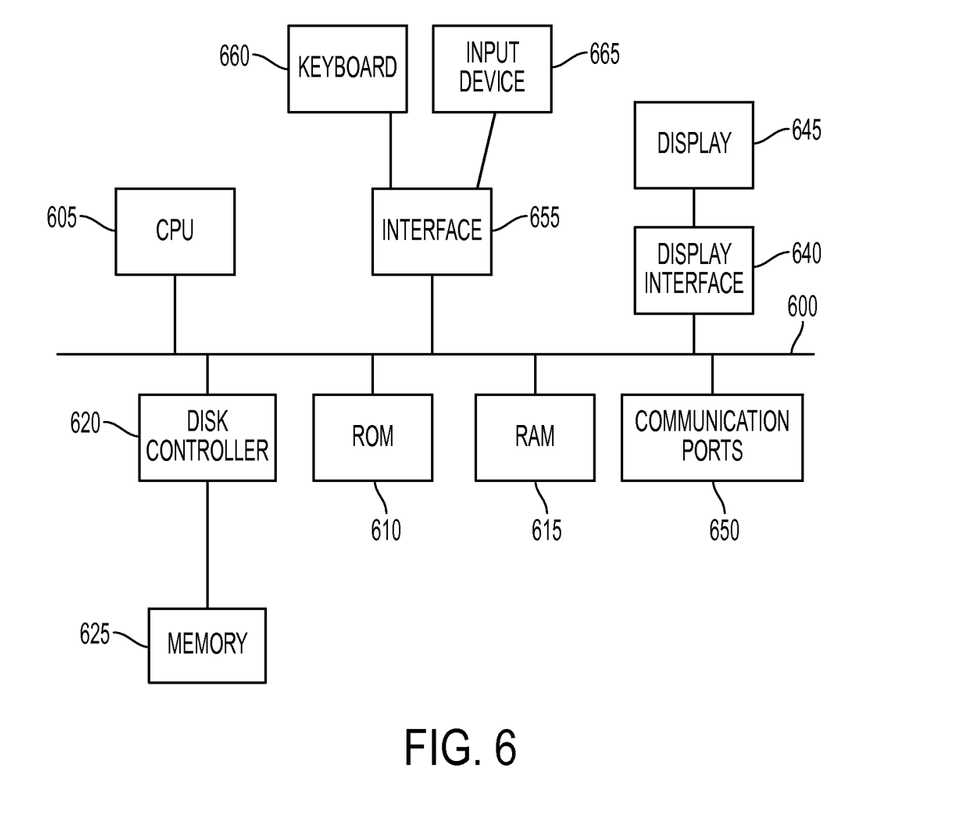
FIG. 6 is a block diagram showing an example electronic device.

FIG. 6 depicts a block diagram of internal hardware that may be used to contain or implement the process discussed above. A bus 600 serves as the main information highway interconnecting the other illustrated components of the hardware. CPU 605 is a processor, the central processing unit of the system that performs calculations and logic operations required to execute a program. CPU 605, alone or in conjunction with one or more of the other elements disclosed in FIG. 6, is a processing device, computing device or processor as such terms are used within this disclosure. Read only memory (ROM) 610 and random access memory (RAM) 615 constitute examples of memory devices.

A controller 620 provides an interface between with one or more optional tangible, computer-readable memory devices 625 and the system bus 600. These memory devices 625 may include, for example, an external or internal DVD or CD ROM drive, a hard drive, flash memory, a USB drive or the like. As indicated previously, these various drives and controllers are optional devices. Additionally, the memory devices 625 may be configured to include individual files for storing any software modules or instructions, auxiliary data, common files for storing groups of results or auxiliary, or one or more databases for storing the result information, auxiliary data, and related information as discussed above.

Program instructions, software or interactive modules for performing any of the methods and systems as discussed in this document may be stored in the ROM 610 and/or the RAM 615. Optionally, the program instructions may be stored on a tangible computer readable medium such as a compact disk, a digital disk, flash memory, a memory card, a USB drive, an optical disc storage medium, such as a Blu-ray™ disc, and/or other recording medium.

An optional display interface 640 may permit information from the bus 600 to be displayed on the display 645 in audio, visual, graphic or alphanumeric format. The display 645 may be an emissive display viewable by directly perceiving the light emitted from the display. Alternatively, the display may be a reflective display viewable by perceiving light reflected off the surface of the display. Communication with external devices may occur using various communication ports 650. A communication port 650 may be attached to a communications network, such as the Internet or an local area network.

The hardware may also include an interface 655 which allows for receipt of data from input devices such as a keyboard 660 or other input device 665 such as a mouse, a joystick, a touch screen, a remote control, a pointing device, a video input device and/or an audio input device.

Figure 7:
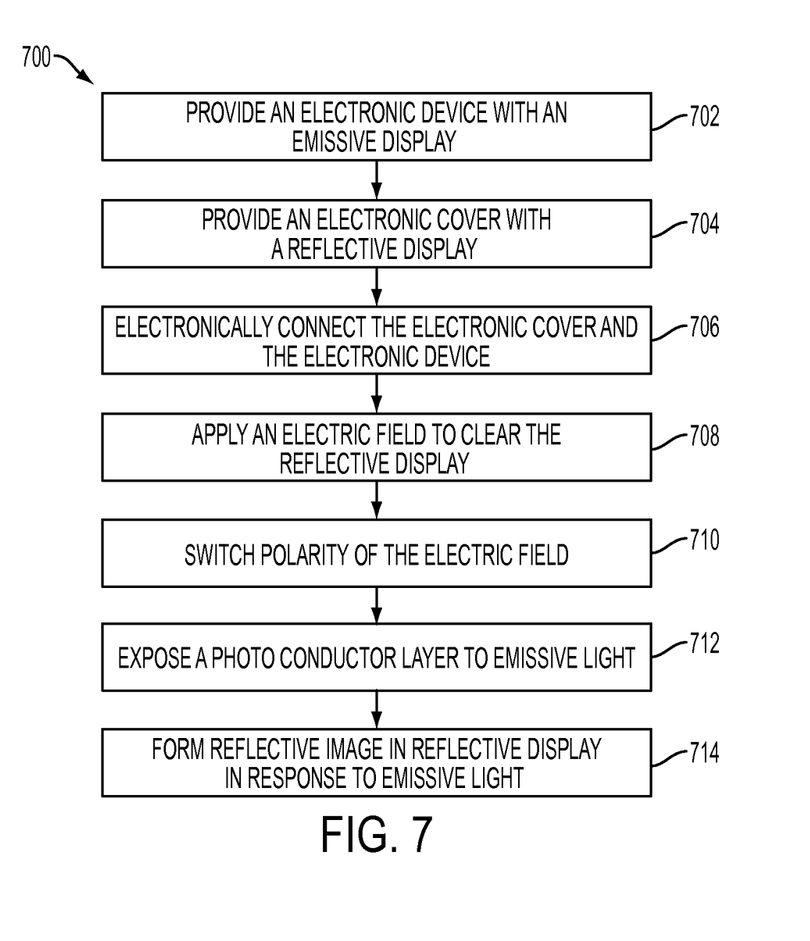
FIG. 7 is a flow chart describing an example method.

Referring now to FIG. 7, an example method 700 is shown that summarizes how an electric cover is used according to various scenarios described in this document. Method 700 begins with the provision of an electronic device that includes an emissive display 702. An electronic cover with a reflective or passive display is also provided 704. The electronic device may be similar to electronic device 102 shown in FIG. 1 and/or described in reference to FIG. 6. The electronic cover may be similar to electronic cover 104 shown in FIG. 1, and/or described in reference to FIG. 2. Using an electronic connector, the electronic cover is coupled or connected to the electronic device 706. Power and optionally control signals, may be communicated through the electronic connection established between the electronic device and the electronic cover. In addition, the device may include one or more mechanical connectors to secure the passive display in position over the emissive display when in use. Any suitable connector, such as a slot, latch, clasp, clip, magnetic connector, friction-based connector, or other device may be used.

As described above with reference to FIG. 2, the electronic cover may include two transparent electrodes that are capable of generating an electric field in the space between them. An electronic field is applied that functions to clear the reflective display 708. As explained above with reference to FIGS. 5A-5D, the reflective display may be responsive to an electric field. Applying an electric field with a proper strength and polarity may operate to clear the display so that a blank (i.e. white) image is shown. The polarity of the electric field is switched but the strength of the field is kept below a threshold level that is required to active one or more of the elements of the reflective display 710. Although the polarity of the electric field has switched, the strength of the electric field is not high enough to trigger the reflective display.

As explained above, the electronic cover may include a photosensitive layer that response to emitted light. In this scenario, the photosensitive layer is exposed to emitted light from the emissive display, causing a charge to form and be transported to the pixel elements of the reflective display 712. The charge from the photosensitive layer is sufficient to cause the strength of the electric field to increase above the threshold, triggering the reflective display. A reflective image is formed on the reflective display in response to the emissive light 714. The reflective image is viewable using reflected light, similar to how a printed document is viewed.

A photo-addressable/photosensitive passive display similar to the scenarios described in this document possess a number of benefits. A hybrid design, such as that shown in FIG. 1, improves the viewing and reading experience of a portable electronic in bright sunlight and for those with eyes sensitive to emissive light displays. A photo-addressable electronic cover is a low cost alternative to purchasing a second device and can be used as a consumable resource. Because the passive display is driven by the emissive display already present in the electronic device, there is no need for a complicated control or driver system. Finally, because the passive display elements are bi-stable, the power consumption of the electronic device is decreased because the emissive display only needs to be powered long enough to establish the reflective image. For example, in situations where the device is used as an e-book reader, i.e., where the need to refresh the display is infrequent, the emissive display can be turned off and/or powered down while the passive display continues to display the reflective image.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

The invention claimed is:

1. A method for displaying an image, the method comprising:
   receiving, by a photoconductor layer of an electronic cover, emissive light from an emissive display of an electronic device;
   generating a charge at the photoconductor layer in response to receiving emissive light; and
   generating, by a passive display layer of the electronic cover, a refractive image in response to the emissive light received by the photoconductor layer.

2. The method according to claim 1, further comprising transporting the charge to an interface between the photoconductor layer and the passive display layer.

3. The method according to claim 2, further comprising applying an electric field across the passive display layer, wherein the passive display layer includes a plurality of reflective display elements that are responsive to the electric field with a potential that is above a threshold voltage.

4. The method according to claim 3, wherein the electric field is applied between a first transparent electrode layer in contact with the photoconductor layer proximate to the emissive display and a second transparent electrode in contact with the passive display layer distal to the emissive display.

5. The method according to claim 4, further comprising:
   reducing the potential of the electric field below the threshold voltage; and
   inverting the polarity of the electric field.

6. The method according to claim 3, wherein the electric field has a potential above the threshold voltage and has a polarity that causes the passive display layer to display a blank background.

7. The method according to claim 6, wherein the charge transported to the interface between the photoconductor layer and the passive display layer is sufficient to increase the potential of the potential of the electric field that has been inverted to a value above the threshold voltage causing the passive display elements proximate to the emissive light to form the reflective image.

8. A reflective display system comprising:
   an emissive display configured to emit light corresponding to a displayed image; and
   a photoconductor layer that is capable of generating a charge when exposed to emitted light; and
   an electronic cover comprising:
      a passive display layer having a plurality of passive display elements; and
      a photoconductor layer that is capable of generating a charge responsive to emitted light from the emissive display,
   wherein the passive display elements are configured form a reflective image that corresponds to the displayed image on the passive display layer in response to exposure of the photoconductor layer to the emitted light.

9. The system according to claim 8, wherein the electronic cover further comprises a charge transport layer that is capable of transporting a charge away from the photoconductor layer.

10. The system according to claim 9, wherein the electronic cover further comprises:
    a first transparent electrode;
    a second transparent electrode; and
    an electronic connector configured to connect to the electronic device and to receive a power signal operative to generate an electric field between the first and second transparent electrodes.

11. The system according to claim 10, wherein the first transparent electrode is in contact with the photoconductor layer proximate to the emissive display and the second transparent electrode in contact with the passive display layer distal to the emissive display.

12. The system according to claim 8, wherein the electronic cover is fitted to cover the emissive display.

13. An electronic device comprising:
    an emissive display;
    a processor in communication with the emissive display;
    an electronic cover proximate to the emissive display, the electronic cover comprises:
       a passive display layer having a plurality of passive display elements; and
       a photoconductor layer that is capable of generating a charge responsive to emitted light from the emissive display
    a computer readable storage medium configured to store program instructions which, when executed, cause the processor to form an emitted light image on the emissive display and expose the photoconductor layer of the electronic cover to an emitted light image, causing the plurality of passive display elements to form a reflective image on the passive display layer so that the reflective image corresponds to the displayed image.

14. The electronic device according to claim 13, further comprising additional program instructions which, when executed, cause the processor to send a first signal to at least one transparent electrode of the electronic cover to clear the plurality of passive display elements of the passive display layer.

15. The electronic device according to claim 14, further comprising additional program instructions which, when executed, cause the processor to, after the reflective image is completely formed on the passive display layer, power down the emissive display.

16. The electronic device according to claim 13, wherein the photoconductor layer comprises a material selected from a group consisting of azo-pigments, perylene pigments, and phthalocyanine pigments.

17. The electronic device according to claim 13, wherein the photoconductor layer comprises a charge transport layer and at least one charge generation layer.

* * * * *